United States Patent [19]

Baumgartner

[11] Patent Number: 5,000,900
[45] Date of Patent: Mar. 19, 1991

[54] TWIN SCREW EXTRUDER

[75] Inventor: Siegfried Baumgartner, Munich, Fed. Rep. of Germany

[73] Assignee: Krauss-Maffei A.G., Munich, Fed. Rep. of Germany

[21] Appl. No.: 365,948

[22] Filed: Jun. 15, 1989

[30] Foreign Application Priority Data

Jun. 15, 1988 [DE] Fed. Rep. of Germany ....... 3820320

[51] Int. Cl.⁵ .............................................. B29C 47/40
[52] U.S. Cl. ................................ 264/211.23; 264/349;
  366/81; 366/85; 425/202; 425/204; 425/382.3
[58] Field of Search ...................... 264/211.23, 211.21,
  264/349, 176.1; 425/204–208, 382.3, 382.4, 202,
  192 R; 366/81, 85

[56] References Cited

U.S. PATENT DOCUMENTS

| | | | |
|---|---|---|---|
| 2,785,438 | 3/1957 | Willert | 425/382.3 |
| 2,813,302 | 11/1957 | Beck | 425/204 |
| 3,486,194 | 12/1969 | Parks | 425/204 |
| 3,501,807 | 3/1970 | Selbach | 425/202 |
| 3,690,623 | 9/1972 | Boyne | 425/207 |
| 3,719,350 | 3/1973 | Loomans | 425/204 |
| 4,447,156 | 5/1984 | Csongor | 425/208 |

FOREIGN PATENT DOCUMENTS

| | | |
|---|---|---|
| 801560 | 1/1951 | Fed. Rep. of Germany . |
| 1726534 | 3/1956 | Fed. Rep. of Germany . |
| 1014735 | 8/1957 | Fed. Rep. of Germany ...... 425/204 |
| 1679884 | 8/1971 | Fed. Rep. of Germany . |
| 2744583 | 4/1979 | Fed. Rep. of Germany ...... 425/204 |
| 1139133 | 6/1957 | France . |
| 55-37942 | 10/1980 | Japan .................. 425/204 |
| 61-290028 | 12/1986 | Japan .................. 425/209 |

Primary Examiner—Jeffery Thurlow
Attorney, Agent, or Firm—Fulbright & Jaworski

[57] ABSTRACT

A twin screw extruder with a material homogenizing unit is the subject of this disclosure. Two extruder screws are located within a housing positioned and configured so that screw turns and screw lands of a first screw mesh with respective screw lands and screw turns of a second screw. A homogenizing zone housing is connected to the dual cylinder housing. Two cell rotors are connected to respective extruder screws and are located within the homogenizing zone housing. A plurality of radially distributed cell walls may be disposed on each cell rotor defining a plurality of open conveyor cells where the cell rotors and cell walls of each rotor are configured to mesh a cell wall with an opposing conveyor cell. The cell walls may be arranged with a slope differing from a slope of the extruder screws. The cell walls may be arranged parallel to or at an angle to an axis of said cell rotors.

40 Claims, 5 Drawing Sheets

FIG. 2
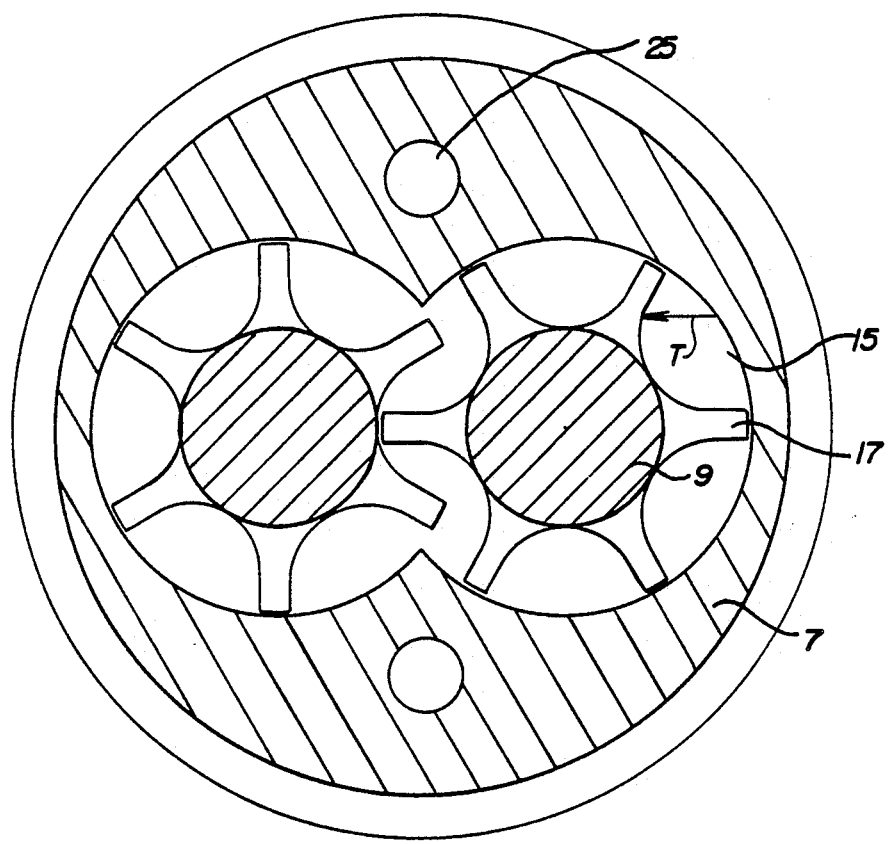
FIG. 3  FIG. 4
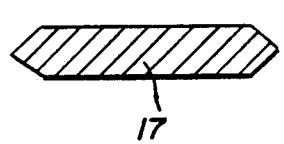 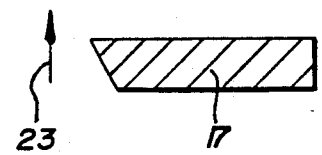

TWIN SCREW EXTRUDER

BACKGROUND OF THE INVENTION

1. Field of the Invention

The invention relates to twin screw extruders and more particularly to an extruder for continuous processing of PVC powders.

2. Description of the Related Technology

Twin screw extruders are continuously operating screw presses with two meshing screws and are used to plasticize and extrude plastics. Twin screw extruders are used preferably for the continuous processing of PVC powder formulations.

Twin screw extruders may be divided into different zones which are distinguished. A melting zone, a mixing zone, a degassing zone and a discharge zone may be arranged in line from an extruder inlet to the outlet. As a rule, the screws have different configurations adapted to the particular zone, over their length. The screw turns may have different pitches and spacing in the zones and may be provided with interruptions, baffles or the like. The screw turns may be replaced by meshing toothed disks or kneading blocks particularly in the melting and/or the mixing zones in order to obtain a particularly intensive mixing of the powder in the melt and to homogenize the melt. The screws usually have continuous screw turns in the discharge zone which mesh with slight roll and flank clearances, thereby preventing any back flow of the melt and producing the necessary pressure for pressing the melt into a molding tool attached to the extruder.

Twin extruders of any type, equipped with cylindrical, conical or double conical screws, have the following problem in common: the melt is exposed to a very high shear force in the wedge or lens shaped overlapping area of the screws, in which the screws turns mesh with slight roll and flank clearances. The melt will be plasticized stronger in this zone and be at a higher temperature and have a lower viscosity than in the other cross-sectional areas of the extruder. Furthermore, the material is driven forward stronger in this overlapping area. The material therefore enters the tool attached to the extruder from the overlapping area at a higher temperature, lower viscosity and a higher driving force, than from the other cross-sectional areas. This results in a loss of quality in the extruded products. This problem leads to variations in PVC tubing wall thickness and corrugations of the internal side of the tubing. Undesirable surface waviness, differences in thickness, flow marks, etc., may result in PVC sheet production. For this reason, PVC foil usually cannot be produced with twin screw extruders. Planetary roll extruders are required, the cost of which amounts to a multiple of that of twin screw extruders. Extruders are frequently operated at only 50% of maximum capacity in the extrusion of PVC profiles. The aforedescribed inhomogeneity of the melt is less pronounced with lower rotating velocities.

Attempts were made to resolve the problem by special adaptations or corrections of the molding tool attached to the extruder, in particular so that the hotter melt from the overlapping area is distributed in different cross section areas of the mold. Also, various eating devices have been mounted on the mold in order to obtain a more uniform temperature distribution of the melt by supplemental heating. All of these measures on the side of the tool were found to be unsatisfactory.

SUMMARY OF THE INVENTION

It is an object of the invention to design a twin screw extruder so that it will deliver the melt at a temperature and viscosity largely uniform over the entire cross section area, to a closed tool. According to the invention the twin screw extruder is designed with an extruder housing having a dual cylinder shaped internal cross section. Two extruder screws are located in the housing configured to be driven in opposing directions. The screw turns and screw lands of the extruder screws and transport an extrusion material to an extruder outlet or a molding tool attached to the extruder. During transport the material is heated and plasticized.

According to the invention a homogenizing zone includes housing part which extends the extruder housing. Extension of the extruder screws, referred to herein as cell rotors, are located in the housing part. The extruder screw/cell rotor combinations rotate in opposing directions. The homogenizing zone may be a unit located in between an extruder screw discharge and a molding tool or as an integral extension of the twin screw extruder. A plurality of radial cell walls define open conveyor cells. The cells walls are circumferentially disposed on the cell rotors extend parallel to or at an angle relative to the rotor axis. The cells walls of one rotor engage the conveyor cells of the other rotor in a contactless meshing manner.

According to the invention, the screw turns of the extruder screws may terminate at an axial distance in front of the leading edge of the cell walls in a manner such the cell walls are preceded by a free annular space. Each cell rotor may carry five, six or seven conveyor cells on its circumference. Each conveyor cell may have a rounded arc like profile. The profile may be essentially a circular arc; the arc radius may be 0.18 to 0.3 times the external diameter ($D_A$) of the rotor. At least the frontal side of the cell walls facing the incoming flow may be sharpened in the manner of a blade.

Advantageously, the cell walls may have one or more interruptions or breaks over their axial length. The interruptions of adjacent cells walls may be located in identical radial planes, so that in the area of the interruptions the cell walls define free annular spaces. Alternatively, the interruptions of adjacent cell walls may be mutually off set in the axial direction. Furthermore, the longitudinal centers of the interruptions may be located on a helical line. Advantageously, the axial length of each interruption is equal to or less than the length of the adjacent sections of the cell walls and preferably ½ to ¼ of the length of the sections.

The axial length of the sections of the cell walls may be 0.2 to 0.4 times the external diameter of the rotor and the axial length of the interruptions may be to 0.1 to 0.3 times the external diameter (D) of the rotor.

In an alternative embodiment, the cell walls may extend at an angle of 10°-40° relative to the axial direction. The homogenizing zone may be an integral part of the extruder.

Alternatively, the homogenizing zone may be a unit attachable to the extruder, with the cell rotors and the extruder screws being equipped with interlocking coupling means.

In the solution according to the invention, a homogenizing zone is provided between the extruder screw discharge zone and the tool, which may be an accessory unit inserted between the extruder and the tool or an integral part of the extruder itself. The effect of the homogenizing zone is to move material coming from the discharge zone of the extruder in a circumferential direction by the cell rotors at a significantly higher velocity than the axial advance produced by the conveyor screws. In this manner in particular the material originating in the overlapping area of the screws is distributed over the entire cross section and is mixed with the cooler material coming from the rest of the cross section areas of the screws. The frontal edges of the cell walls of the rotors exposed to the flow act as cutting edges in the process and continuously cut thin layers from the material slug pushed forward by the screws and offset the layers relative to each other in the circumferential direction. The material discharged from the homogenizing zone is made up of numerous thin material layers originating alternatively in the overlapping area of the screws and the other cross-sectional areas. Furthermore, a uniform quality of material discharged at all points of the cross section of the homogenizing zone output.

The inhomogeneities existing at the edge of the discharge zone of the screws are largely homogenized at the outlet of the homogenizing zone. The important factor here is that the material is not exposed to repeated shear and kneading stresses, which in turn could lead to locally inhomogeneous heating and plasticizing. The cell rotors are therefore laid out in the cell walls cross sections in a manner such that their each cell rotors do not contact the other cell rotary and leave a considerable clearance. The rotors may be any configuration which operates to significantly accelerate the circumferential velocity of the material relative to the axial velocity. The rotors are elements which serve to distribute highly plasticized material originating from cross-sectional areas of a discharge zone, which tend to highly plasticize material, throughout or more evenly throughout the cross-section of the homogenizing unit output.

The cell walls of the rotors may extend in an axially parallel manner or at an angle to the axial direction, i.e. helically. In the latter case, the cell walls apply an additional thrust effect to the material in the axial direction, which depending on the direction of rise of the cell walls acts in the direction of conveyance by the screws, or against it, thereby braking the flow of material. Preferably, the cell walls rise in the same direction as the turns of the screws, but at a much larger angle, preferably of 50°-80° The walls thereby impart a conveying effect to the material which is significantly smaller than the conveying pressure provided by the turns of the screws, but is adequate to move the residual material out of the homogenizing zone following the completion of an extrusion operation, when the screw turns no longer contain any material.

To enhance the mixing and homogenizing effect, the cells walls preferably include one or more interruptions over their axial length. The axial length of these interruptions is preferably smaller than the adjacent sections of the cell walls. The interruptions may be one fourth the length of the cell walls. The interruptions may be located adjacent to each other in the same radial plane, so that the cell walls form free annular spaces. The interruptions may also be offset in the axial direction relative to each other. In this case, the centers of the lengths of the interruptions may be located preferably on helical lines, the direction of rise whereof may be identical with that of the cell walls or may oppose the latter. In this manner, there is a constant passage of material between the adjacent cells of every cell rotor, together with the simultaneous axial displacement of the material.

An embodiment of the invention will become more apparent from the drawings.

BRIEF DESCRIPTION OF THE DRAWINGS

FIG. 2 shows a section on the line II—II of FIG. 1.

FIG. 3 shows a section through line III—III of FIG. 1.

FIG. 4 shows an alternative embodiment of a section through line III—III of FIG. 1.

DETAILED DESCRIPTION OF THE PREFERRED EMBODIMENT

Figure 1:
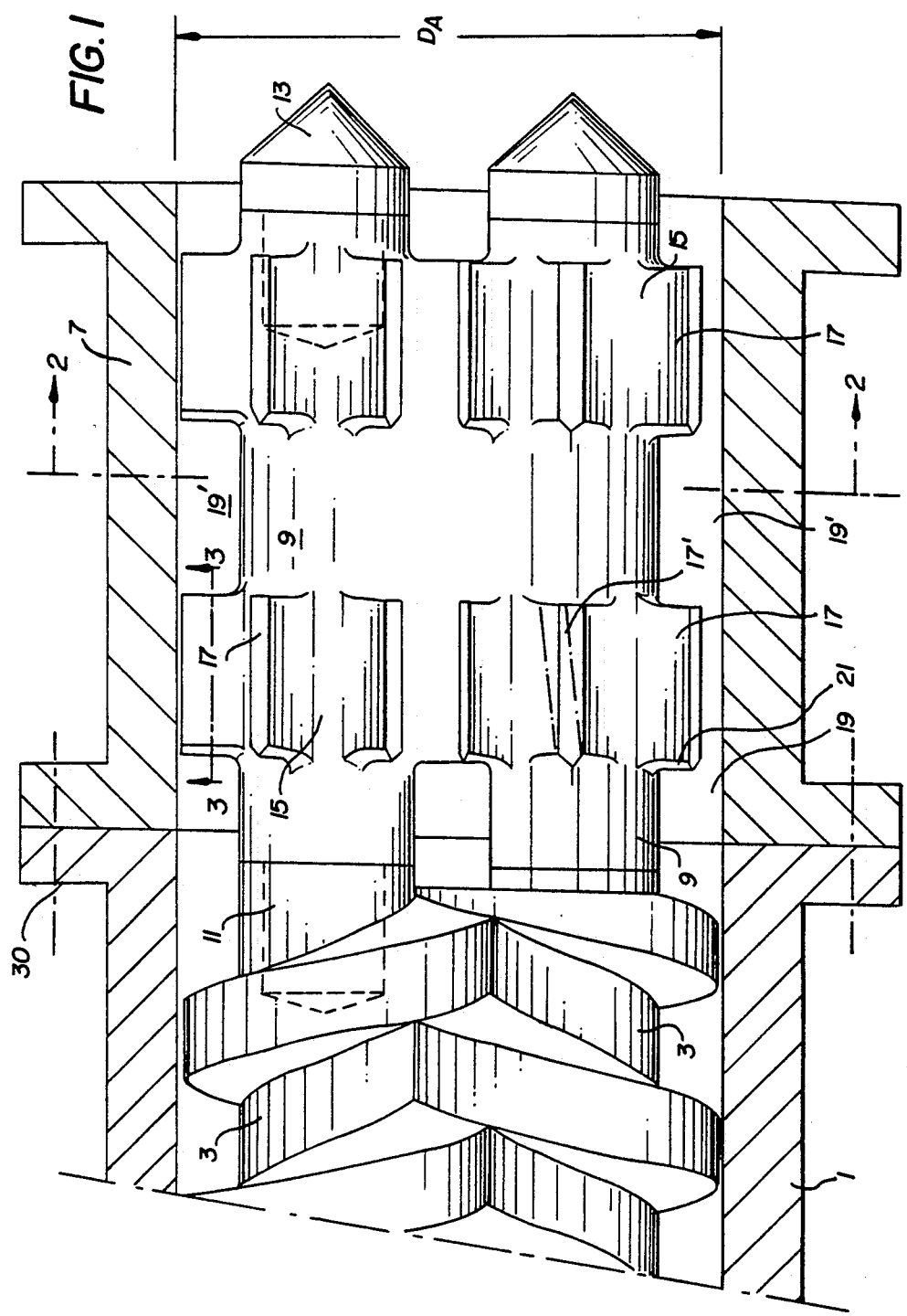
FIG. 1 shows a longitudinal section in a top elevation through the discharge end of twin screw extruder with a homogenizing zone.

According to FIG. 1, the twin screw has a cylindrical housing 1. The internal space of the cylinder housing defines two intersecting cylinders, i.e., the shape of a prone FIG. 8. Two extruder screws 3 are located in the cylinder housing. The screw turns and screw lands in the discharge zone are shown engaging each other in a meshing and rolling manner, so that the material in the turns of the screws is moved forward in the axial direction and the pressure required for extrusion is generated. The intermeshing of the screws results in a volumetric transport, for which reason the discharge zone is also designated the metering zone. The discharge zone is shown in the left side of FIG. 1. An additional zone follows the discharge zone (right side of FIG. 1) of the twin screw extruder. The screws in different zones may carry other screw profiles or in certain sections even toothed disks, kneading elements, or the like.

A homogenizing zone housing 7 may be mounted at an outlet end of the extruder. Flange screws 30 may be utilized to mount the homogenizing zone housing 7. The homogenizing zone housing 7 preferably has the same external and internal dimensions as the extruder housing 1. Two cell rotors 9 are located in the housing 7, see also FIG. 2. The rotors may be connected fixedly in rotation to the extruder screws 3. Each cell rotor is provided with a threaded extension 11, which fits into a threaded recess at the front end of the screw 3. The recess in the screw is of the type suitable for fastening a discharge cone. The cell rotor 9 is then mounted in place of the discharge cone on the end of the extruder screw 3. The discharge cone 13 may be fastened in a similar manner on the end of the rotor 9. The cell rotors thus run together with screws 3 in directions opposing each other.

The cell rotors 9 display a plurality of cell walls 17 which segregate the internal cylinders of the homogenizing zone into circumferentially distributed conveyor cells 15. Each rotor is equipped with circumferentially distributed conveyor cells 15. The conveyor cells are separated from each other by axially parallel cell walls 17. The cell walls rotate with a slight gap along the internal surface of the cylinder housing. The external diameter of the cell rotors 9 may be essentially the same as that of the conveyance screw 3. Five, six or seven conveyor cells 15 may be distributed over the circumference of each rotor 9. The conveyor cells preferably exhibit a circular segment cross section contour as shown in FIG. 2. The arc radius in the six cell embodiment shown is about 0.22 times the external diameter $D_A$. Each conveyor cell or one rotor is opposed by a cell wall of the other rotor, so that rotors mesh without contact and with a large clearance.

The cell walls 17 and conveyor cells 15 may extend over the entire length of each rotor 9, or as shown, over two or more axial sections of each rotor. Each conveyor cell or each section of the conveyor cells is preceded by a free annular space 19. This annular space is filled by the melt, which is moved forward by the conveying action of the screws 3 in the axial direction, essentially without any movement in the circumferential direction. As soon as the melt reaches the edge 21 of the cell walls 17, it is entrained in the circumferential direction, with the median circumferential velocity typically amounting to at least about 10 times the axial advance produced by the screws 3 and effective in the annular space 19. The edges 21 of the cell walls continuously cut thin layers of material from the mass advancing in the annular space 19 and off setting the layers in a circumferential direction. A typical layer thickness is less than 5 mm. Thin layers of the material originating in different cross section areas of the extruder 1, are placed in succession behind each other. The material portions originating in the overlapping area of the screws 3, which are heated and plasticized more strongly, are distributed and intermixed uniformly with the other material components from the other areas. This process is repeated in each axial spared section of conveyor cells 15 and cell walls 17. Each cell section is preceded by a flow quieting annular space 19 and 19'.

The material flow meets edges 21 of the cell walls 17. The edges 21 may be configured to avoid any material or products baking on to the cell walls or edges. All of the flow transition surfaces of the rotor core may be pointed or arrow shaped. The frontal surface of each of the cell walls may extend in an axially perpendicular plane, but again passes into the rotor core in a rounded manner. Obviously, other configurations of the front and rear edges of the cell walls are also possible. For example, FIG. 3 shows an embodiment wherein both the front and rear edges are sharpened in the manner of an arrow. FIG. 4 shows an embodiment in which the flow edge is bevel led to one side only, so that a cutting blade pointing into the direction of rotation (arrow 23) is formed. This results in an especially effective peeling of the thin layers of material from the material plug in the annular space 19.

$D_A$ designates the external diameter of the screws 3 and also of the rotors 9; the axial length of the conveyor cells 15 or the cell walls 17 preferably amounts to (0.2 to 0.4) $D_A$, and similarly the axial length of each annular space 19 and 19' is again (0.2 to 0.4) $D_A$. Not only two sections of conveyor cells 15 as shown, but three, four or more sections with annular spaces 19; in between, may follow each other. The gap between the crest track of each cell wall 17 and the inner surface of the housing 7 preferably is between 0.3 and 0.6 mm.

The cell walls 17 and the conveyor cells 15 formed by them need not be exactly axially parallel. To achieve certain effects, it is possible to mount them at a small angle of up to 10° relative to the axial direction, as indicated by a dash-and dot line in FIG. 1 at 17'. However, the oblique position of the cell walls 17 in this embodiment is so small that no appreciable axial advance is produced in the homogenizing zone. The housing 7 may be provided with channels 17 (FIG. 2) for the passage of a heating or cooling medium in order to heat or cool the inner surface of the housing.

Instead of providing the homogenizing zone as an ancillary unit mounted on the end of the extruder housing 1, the homogenizing zone may be an integral part of the extruder itself, by laying out the last section of the conveyor screws 3 with the configuration of cell rotors 9.

The extrusion tool to be supplied with the melt may be connected directly to the end of the homogenizing zone to the right in FIG. 1. The tool may be one suitable for extrusion of tubes. plates, foil or profiles. Melt is supplied to the tool from the homogenizing zone in a completely homogenized state without local temperature and viscosity differences.

While the aforedescribed embodiment of the invention concerns a twin screw extruder with axially parallel cylindrical extruder screws, the invention is also applicable to extruders with conical or doubly conical screws. In this case the cell rotors 9 must be designed as an extension of the extruder screws with the appropriate conicity and with converging axes.

Figure 5:
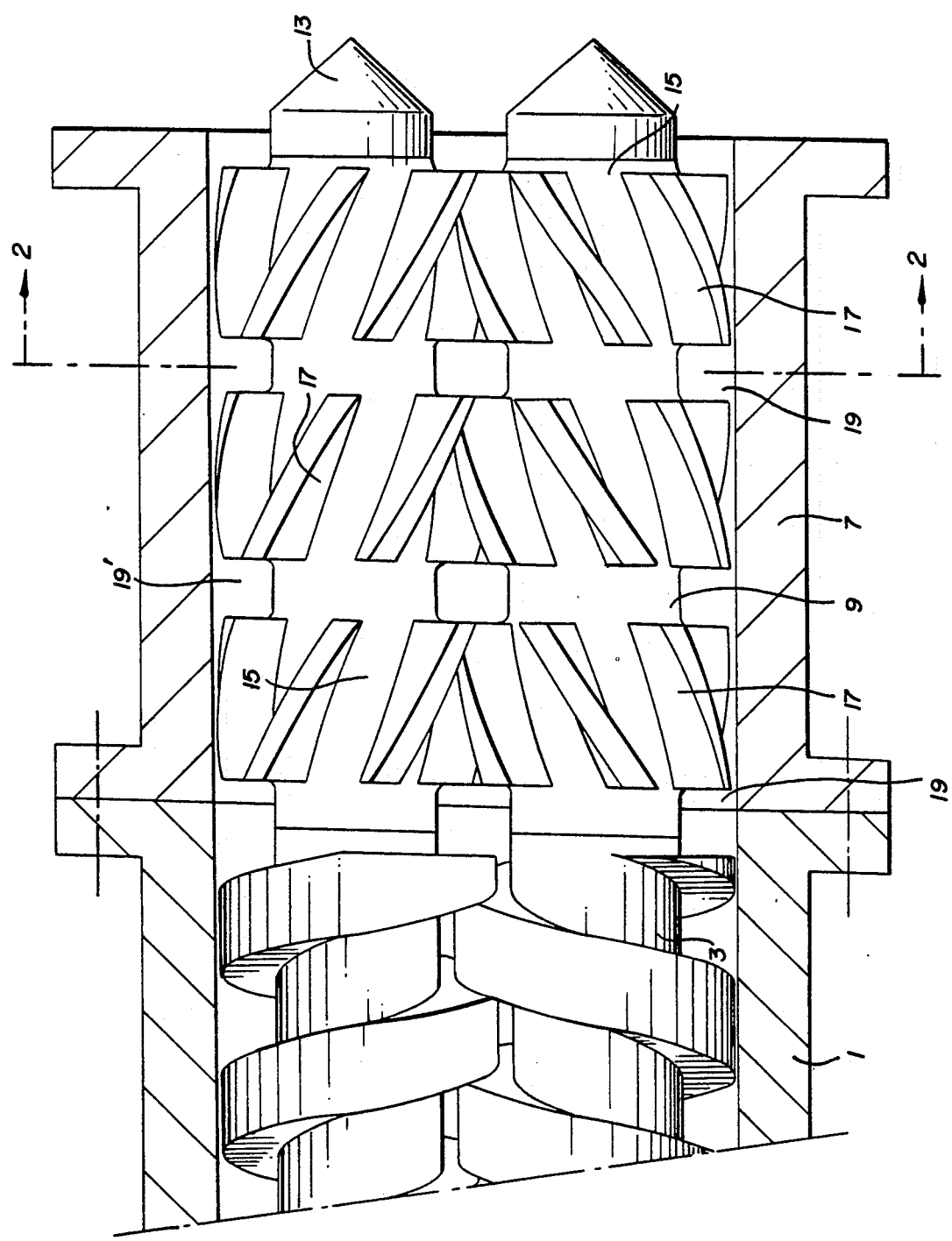
FIG. 5 shows another embodiment of a twin screw extruder according to the invention.
Figure 6:
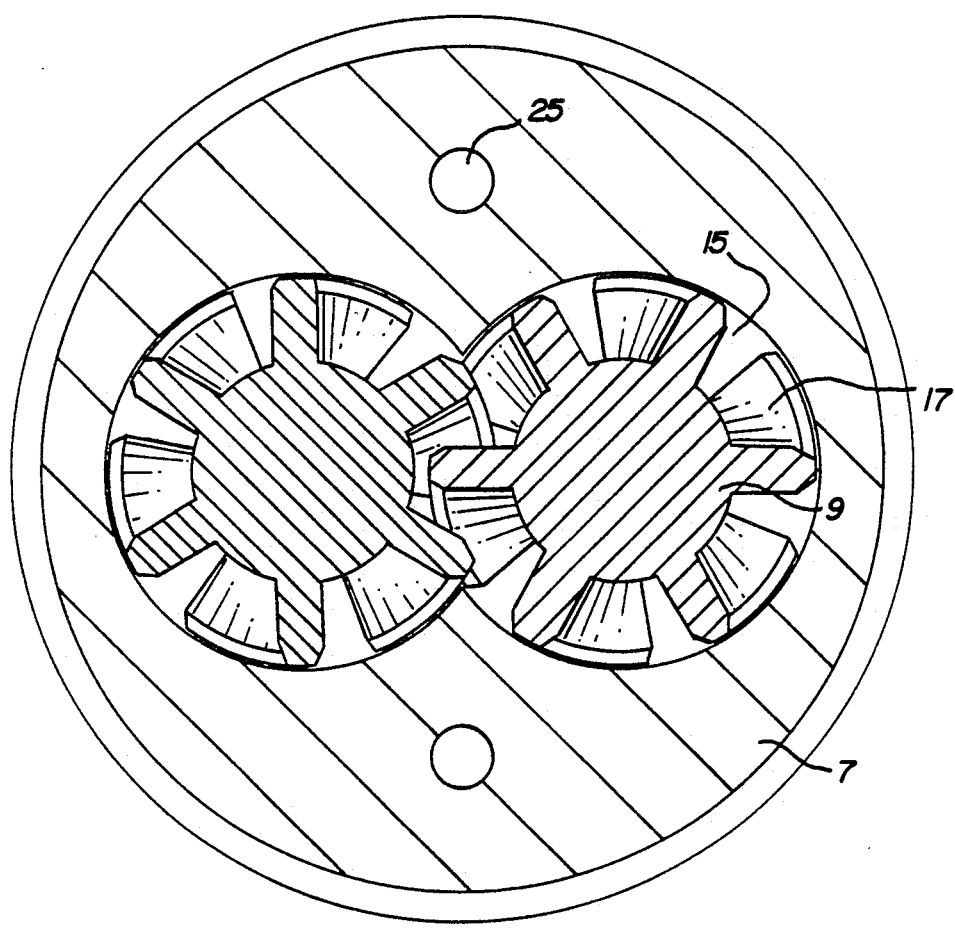
FIG. 6 shows a cross-section through line II—II of FIG. 5.

In a further embodiment of the present invention according to FIGS. 5 and 6, the axial advance of the melt in the area of the homogenizing zone is to be supported. Two cell rotors are equipped on their circumference with a plurality of helical cell walls 17 separating and partially defining conveyor cells 15. The cell walls 17 are arranged at an angle between 10 and 50 degrees relative to the axis. The front and read edges of the cell walls 17 are angled at 40 to 80 degrees.

The axial length of the conveyor cells 15 or cell walls 17 preferably remain equal, at (0.2 to 0.4) $D_A$, to the length of the embodiment shown in FIGS. 1 and 2. The axial length of the annular space 19 preferably amounts to (0.2 to 0.3) $D_A$ according to FIG. 6. The axial length of the annular spaces 19' is in the range of (0.1 and 0.2) $D_A$. In this embodiment more than the three sections of the conveyor cells 15, shown with the annular spaces located in between, may be axially arranged. The gap between the crest track of each cell wall 17 and the inner surface of the housing 7 preferably is between 0.1 and 0.6 mm.

All other characteristics are identical with those of the embodiment described in connection FIGS. 1 and 2 of the cell rotors 9.

Figure 7:
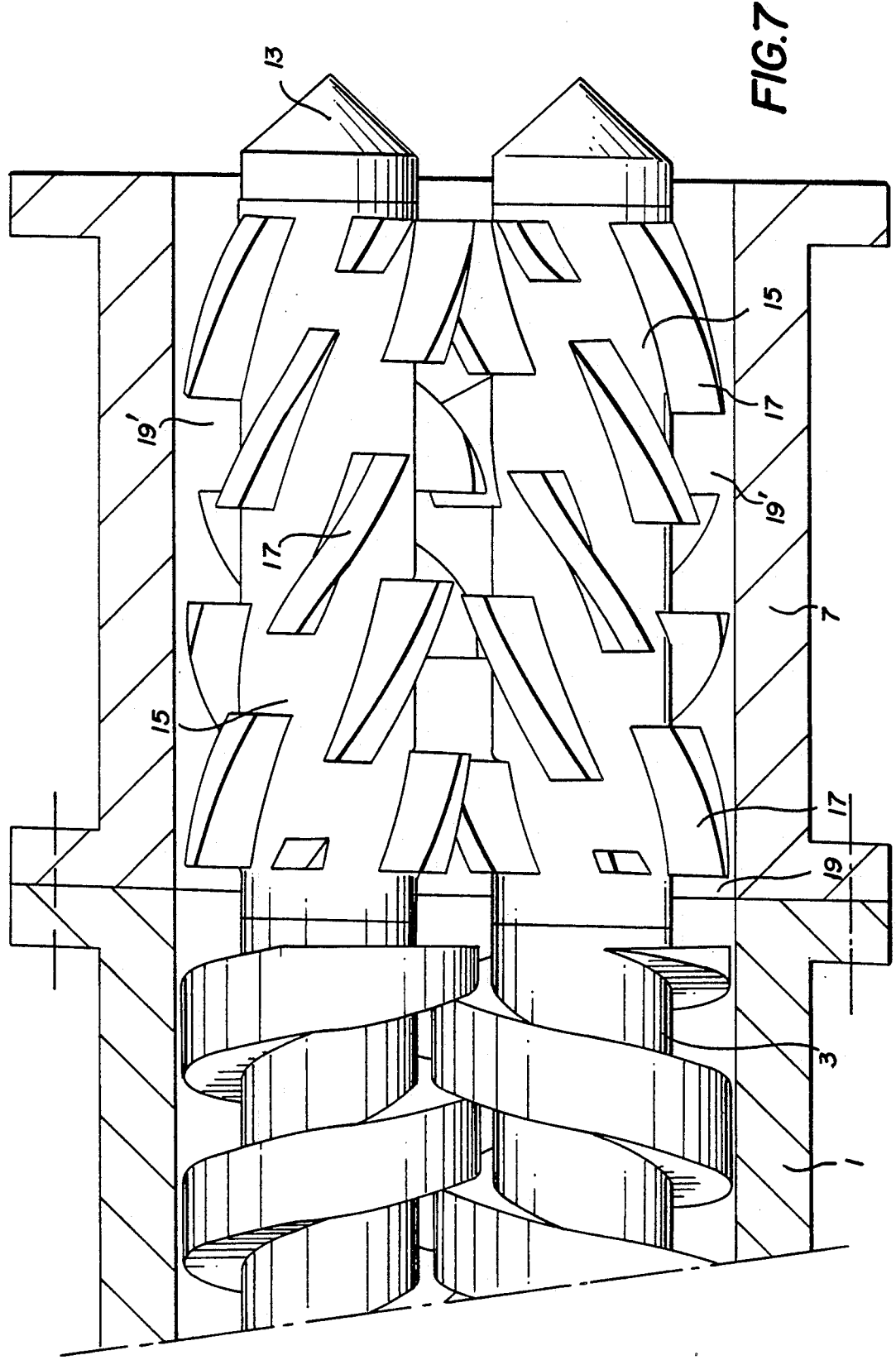
FIG. 7 shows yet another alternative embodiment.

Another embodiment, according to FIG. 7, differs from that of FIG. 5 by that the interruptions 19' of the helical cell walls 17 of the cell rotors 9 are arranged so that they are not adjacent to each other thereby forming a plurality of annular spaces, but that they are located in helical lines the rise whereof preferably is the inverse of that of the cell walls 17, whereby part of the melt flowing through the conveyor cells 15 is mixed transversely.

The rise of the helical lines formed by the interruptions 19' may for example be equal to the angle included by the cell walls 17 with the axial directions and amounts in keeping with the technical requirements of the process to between 10 and 15 degrees.

The length of the actively transporting cell walls 17 is preferably three to four times the axial length of the interruptions 19' in the embodiment of FIG. 7. Relative to all other characteristics, this embodiment is identical to the embodiments described in FIGS. 5 and 6.

What is claimed is:

1. A twin screw extruder comprising:
    a dual cylinder housing;
    two extruder screws located within said housing positioned and configured so that screw turns and screw lands of a first screw mesh with respective screw lands and screw turns of a second screw;
    a homogenizing zone housing connected to said dual cylinder housing;
    two cell rotors connected to respective extruder screws and located within said homogenizing zone housing;
    a plurality of radially distributed cell walls disposed on each cell rotor defining a plurality of open conveyor cells where said cell rotors and cell walls of each rotor are configured to radially mesh a cell wall with an opposing open conveyor cell.

2. A twin screw extruder according to claim 1 wherein said cell walls are arranged with a slope differing from a slope of said extruder screws.

3. A twin screw extruder according to claim 2 wherein said cell walls are arranged parallel to an axis of said cell rotors.

4. A twin screw extruder according to claim 2 wherein said cell walls are arranged at an angle to an axis of said cell rotors.

5. A twin screw extruder according to claim 1 wherein a free annular space is defined between a terminal end of said screw turns and an initial end of said cell walls.

6. A twin screw extruder according to claim 1 wherein said plurality of cell walls comprises at least five cell walls.

7. A twin screw extruder according to claim 6 wherein s id plurality of cell walls comprises at least six cell walls.

8. A twin screw extruder according to claim 7 wherein said plurality of cell walls comprises at least seven cell walls.

9. A twin screw extruder according to claim 7 wherein adjacent cell walls and said cell rotor exhibits a rounded cross-sectional profile.

10. A twin screw extruder according to claim 9 wherein said profile is a circular arc exhibiting a radius of 0.18 to 0.3 times an external diameter ($D_A$) of said cell rotor including said cell walls.

11. A twin screw extruder according to claim 1 wherein said initial end of said cell walls exhibits a tapered configuration.

12. A twin screw extruder according to claim 1 wherein each of said cell walls comprises a plurality of cell wall segments defining gaps in said cell walls.

13. A twin screw extruder according to claim 12 wherein said gaps are axially aligned and said cell wall segments define a free annular space.

14. A twin screw extruder according to claim 12 wherein said gaps are axially offset.

15. A twin screw extruder according to claim 14 wherein said gaps are helically aligned.

16. A twin screw extruder according to claim 12 wherein an axial length of said gaps is one quarter to one-half an axial length of said cell wall segments.

17. A twin screw extruder according to claim 12 wherein;
    an axial length of said cell wall segments is 0.2 to 0.4 times an external diameter ($D_A$) of said cell rotor including said cell walls, and
    an axial length of said gaps is 0.1 to 0.3 times $D_A$.

18. A twin screw extruder according to claim 4 wherein said angle is 10-40 degrees.

19. A twin screw extruder according to claim 1 wherein said cell rotors and homogenizing zone housing are integral to said extruder screws and said dual cylinder housing respectively.

20. A twin screw extruder according to claim 1 wherein said homogenizing zone housing and said cell rotors are configured as a detachable homogenizing unit and said cell rotors are connected to said extruder screws at an interlocking joint.

21. A twin screw extruder comprising:
    plasticizing unit exhibiting two meshed extruder screws axially arranged in a cavity in an overlapping barrel housing;
    a homogenizing unit connected to an output end of said plasticizing unit comprising at least;
    a homogenizing unit housing connected to said overlapping barrel housing; and
    a homogenizing rotor element located within said homogenizing unit housing wherein said homogenizing rotor element comprises at least;
    two screw extensions connected to said extruder screws exhibiting non-contacting, radially intermeshing and radially extending ribs which display a significantly smaller slope with respect to an axis of said barrel than a slope of said extruder screws.

22. An extruder according to claim 21 wherein said extensions exhibit 5-7 circumferentially distributed ribs.

23. An extruder according to claim 21 wherein said ribs are arranged at an angle of less than 40 degrees. To an axis of said extruder screws.

24. An extruder according to claim 23 wherein said angle is 10-40 degrees.

25. An extruder according to claim 23 wherein said angle is less than 10 degrees.

26. An extruder according to claim 21 wherein said ribs extend parallel to an axis of said extruder screws.

27. An extruder according to claim 21 wherein said ribs are arranged to slope in a direction opposite a slope of said extruder screws.

28. An extruder according to claim 21 wherein said ribs are configured to define a free annular space between a terminal end of said extruder screws and an initial end of said ribs.

29. An extruder according to claim 21 wherein said ribs comprise noncontinuous rib segments defining at least one interruption.

30. An extruder according to claim 29 wherein interruptions in said rib segments are axially aligned and define a free annular space.

31. An extruder according to claim 29 wherein interruptions in said rib segments are axially offset.

32. An extruder according to claim 31 wherein said interruptions are helically aligned.

33. An extruder according to claim 21 wherein cells defined between adjacent ribs display circular-arc cross sectional profiles.

34. An extruder according to claim 21 wherein said homogenizing unit is a detachable unit.

35. An extruder according to claim 21 wherein said screw extensions are integrally connected to said extruder screws.

36. An extruder according to claim 21 wherein said screw extensions are connected to said extruder screws at an interlocking joint.

37. An extruder according to claim 35 wherein said homogenizing unit housing is integrally connected to said overlapping barrel housing.

38. An extruder according to claim 29 wherein said rib segments include at least an edge angled at 50-80 degrees.

39. A plastic material extrusion method comprising the steps of:

plasticizing material in a twin screw extruder plasticizing zone and outputting said material with a substantial conveying movement;

homogenizing material output from said plasticizing zone of said extruder by imparting positive circumferential displacement to material output from said plasticizing zone with a velocity significantly higher than that of said conveying movement.

40. A method according to claim 38 where the step of homogenizing comprises continuously cutting thin layers of material discharged from said plasticizing zone and offsetting said layers in a circumferencial direction.

* * * * *